United States Patent
Fey

(10) Patent No.: US 6,992,467 B1
(45) Date of Patent: Jan. 31, 2006

(54) SAFETY BARRIER FOR LIMITING CURRENT AND VOLTAGE

(75) Inventor: Wilhelm Fey, Dirmstein (DE)

(73) Assignee: Pepperl & Fuchs GmbH, Mannheim (DE)

( * ) Notice: Subject to any disclaimer, the term of this patent is extended or adjusted under 35 U.S.C. 154(b) by 0 days.

(21) Appl. No.: 09/937,968

(22) PCT Filed: Mar. 31, 2000

(86) PCT No.: PCT/EP00/02889

§ 371 (c)(1),
(2), (4) Date: Jan. 30, 2002

(87) PCT Pub. No.: WO00/62394

PCT Pub. Date: Oct. 19, 2000

(30) Foreign Application Priority Data

| Mar. 31, 1999 | (DE) | 199 14 549 |
| May 31, 1999 | (DE) | 199 24 746 |
| Jul. 8, 1999 | (DE) | 199 31 721 |

(51) Int. Cl.
*G05F 1/563* (2006.01)

(52) U.S. Cl. .............. 323/266; 323/299; 323/908; 361/18

(58) Field of Classification Search ........... 323/266, 323/282, 285, 299, 908; 361/18
See application file for complete search history.

(56) References Cited

U.S. PATENT DOCUMENTS

| 3,818,273 A | 6/1974 | Nakashima et al. | 317/22 |
| 4,831,484 A * | 5/1989 | Bruch | 361/101 |
| 4,979,067 A * | 12/1990 | Foley | 361/18 |
| 5,036,269 A * | 7/1991 | Murari et al. | 323/266 |
| 5,179,488 A * | 1/1993 | Rovner | 361/18 |
| 6,169,391 B1 * | 1/2001 | Lei | 323/266 |
| 6,300,748 B1 * | 10/2001 | Miller | 323/285 |
| 6,366,437 B1 * | 4/2002 | Graube | 361/93.9 |
| 6,369,997 B2 * | 4/2002 | Graube | 361/93.9 |

FOREIGN PATENT DOCUMENTS

| DE | 3622268 | * 11/1988 |
| DE | 3804250 | 7/1989 |
| EP | 310280 | * 4/1989 |
| EP | 359912 | * 3/1990 |
| WO | 9202066 | 2/1992 |

* cited by examiner

*Primary Examiner*—Jeffrey Sterrett
(74) *Attorney, Agent, or Firm*—Horst Kasper

(57) ABSTRACT

The invention relates to a safety barrier for limiting the current and voltage of an electrical consumer (15) connected downstream thereof. The safety barrier comprises an input terminal (8) and an output terminal (16) and an input and output terminal (10, 17) of a common line (12), and has at least one voltage and current-limiting device (7, 13, 14), which comprises a fuse (F1), a voltage-limiting device (D3) that is associated with the common line (12), a current-limiting device (R6) that is connected to the output of the common line and an additional protection circuit that is located in front of the voltage and current-limiting device (17, 13, 14).

31 Claims, 8 Drawing Sheets

SAFETY BARRIER FOR LIMITING CURRENT AND VOLTAGE

TECHNICAL FIELD

Figure 1:
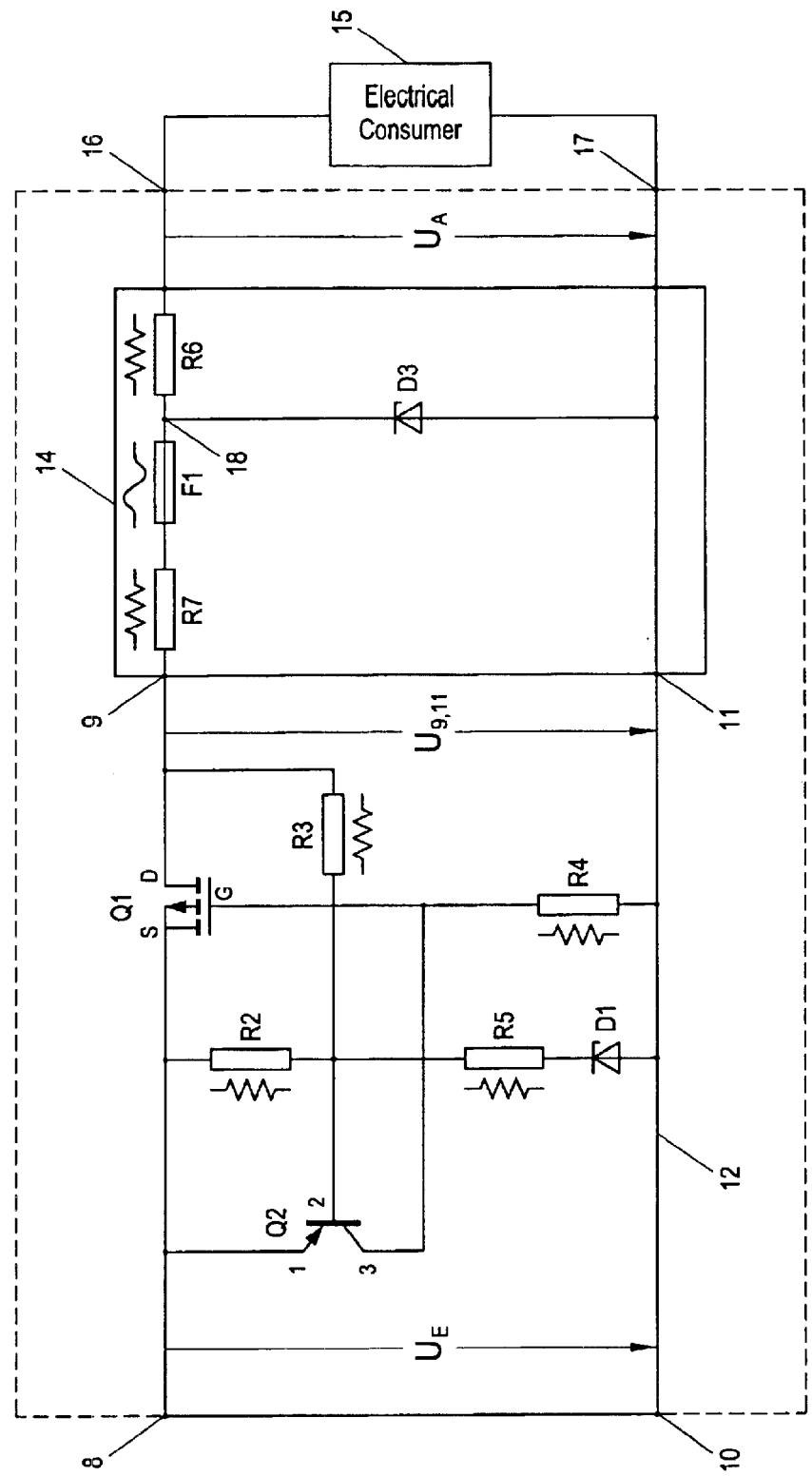

The invention relates to a safety device for limiting current and voltage of an electrical consumer connected downstream of the safety device, wherein the electrical consumer is for example a measurement value transmitter with at least one input connection and one output connection as well as input connection and output connection of a common line, for example a ground line, wherein the safety device includes at least one voltage limiting device and current limiting device such as a Zener barrier, comprising at least one protective device such as a fuse, a voltage limiting device referring to the common line, a current limiting device connected to the output of the voltage limiting device as well as a further protective circuit, which is disposed ahead of the voltage limiting device and the current limiting device.

STATE-OF-THE-ART

Many electrical apparatuses or electrical consumers have to be protected against high voltages in order to avoid interruptions, which can lead to damages. In particular, such protective circuits are necessary in regions endangered by explosion.

A circuit arrangement for a safety barrier according to the initially recited kind for limiting of current and voltage at the two wire line running in a region endangered by explosions with two fuses has become known through the European printed patent document EP 0,359,912 A1, said switching arrangement having an input exhibiting two input connections, wherein a voltage source can be connected to the input and an output exhibiting two output connections, wherein the output is connected to a two wire line. A first voltage limiting circuit is connected to the input connections, which first voltage limiting circuit includes a first fuse and a first voltage limiting device. The output of the voltage limiting circuit is connected to a current limiting circuit, wherein at least several parts of the circuit arrangement including the fuse are encased inaccessibly in a casing.

A circuit including a second fuse and a second voltage limiting device exhibiting characteristics similar to those of a Zener diode is disposed between the input and the first voltage limiting circuit. The first voltage limiting circuit is connected on the input side in parallel to a second voltage limiting device and is connected through the second fuse to the input, wherein at least the second fuse is manually accessible. Thus the accessible fuse can also be exchanged in case of a short circuit at the safety device. It is a disadvantage to employ two fuses, of which two fuses one burns through upon responding of the safety device and has to be exchanged manually. An automatic turning on again of the switching device is not possible.

A safety barrier with a barrier input exhibiting two connections, with the barrier output exhibiting two connections and an electronic longitudinal control member with a control input and disposed in a connection between the barrier input and the barrier output has become known from the German patent DE-PS 3622268 (U.S. Pat. No. 4,831,484), wherein the longitudinal control member can be a transistor. A fuse furnished at the input in connection with voltage limiting Zener diodes serves to switch off the output voltage then, when the voltage at the input of the safety barrier surpasses the blocking voltage of the Zener diodes. Otherwise a current increase would be the consequence, wherein the current increase would be disposed above the current, which current may be delivered by the safety barrier at the output of the safety barrier to the consumer in case of a maximum permissible input voltage. In this case the fuse is released and switches off the output voltage. The maximum output current occuring in case of a short circuit is disposed normally below the release current of the fuse, such that the fuse nominally does not respond in this case. If however the maximum output current is disposed above the release current of the fuse, then device elements of the safety barrier burn through irrepairably such that the non-exchangeable fuse cannot perform its purpose.

A shunt diode safety barrier for connection to a voltage source has become known through the European printed patent document EP 0310280 B1, said shunt diode safety barrier including a shunt diode means, a fuse device component on the voltage supply side of the shunt diode means, a current limiting circuit connected in series with the fuse device component and disposed in sequence with a load for switching and with a heat protective means in order to prevent an overheating of the barrier device components, in case an excessive voltage is applied. The current limiting circuit is connected in series between the fuse device component and the shunt diode means and is disposed such that the fuse device component is protected against applied voltages which are larger than the normal maximum working voltage. The heat protective means within the safety barrier includes a Zener diode, wherein the Zener diode is connected between the fuse device component and the current limiting circuit. This circuit is associated with a disadvantage that the circuit exhibits a high shunt current and thereby a high dissipation loss power. In addition this kind of circuit has a substantial longitudinal voltage drop.

A safety barrier with two transistors for limiting of current and voltage of an electrical consumer to connected downstream from the safety barrier has become known from U.S. Pat. No. 3,818,273, wherein the electrical consumer has at least one input connection and one output connection, wherein the safety barrier has at least one voltage and current limiting device, such as a Zener barrier, as well as exhibits a current limiting device connected to the output of the Zener barrier. A voltage sensor circuit is provided for voltage detection between the base of the second transistor and a common line. It is disadvantageous that the circuit, which is laid out for several 10 volts, exhibits a substantial shunt current, since a voltage divider out of two resistors is disposed at the input of the circuit, wherein the base of the first transistor is connected between the two resistors through a diode. A continuous shunt current flows through this voltage divider.

A two wire device for protecting a process control device connected downstream of the two wire device has become known from the printed patent document WO 92/02066, wherein the two wire device exhibits a current circuit for protecting against over currents or reverse currents. For this purpose the two wire device has two current sensors, which control circuits with variable impedances, which variable impedances in turn limit the output currents, which output currents are led thereafter to the process control device.

Finally a switching device for a current limiting for shunting in front of digital long distance apparatuses fed through the subscriber line has become known through the German printed patent document DE 3804250. A field effect transistor is disposed in the longitudinal branch of the circuit arrangement, wherein the passage of the field effect transistor through the gate of the field effect transistor is controlled both by the through control of a transistor depending on the applied supply voltage as well as by the charge of a capacitor.

TECHNICAL OBJECT

It is an object of the present invention to furnish a safety device of the recited kind for protecting a voltage and current limiting device, such as a Zener barrier or another circuit to be protected, wherein the safety device is to protect the voltage and current limiting device against destruction upon over voltage as well as the safety device is to exhibit in particular a low dissipation loss power, wherein voltage losses as well as shunt currents are to be only small.

DISCLOSURE OF THE INVENTION AND OF THE ADVANTAGES OF THE INVENTION

This object is achieved by a safety device for limiting of current and voltage of an electrical consumer such as for example a measurement value transmitter connected downstream to the safety device, wherein the electrical consumer is furnished with at least one input connection and one output connection as well as input and output connection of a common line, for example a ground line, wherein the safety device exhibits at least one voltage and current limiting device such as a Zener barrier, comprising at least one protective device such as a fuse, a voltage limiting device referring to the common line, a current limiting device connected to the output of the voltage limiting device as well as a further protective circuit, which further protective circuit is disposed in front of the voltage and current limiting device, wherein the further protective circuit includes a field effect transistor as a switching and/or regulating transistor, wherein the source drain leg of the switching and/or regulating transistor is disposed between the input connection and the voltage and current limiting device and wherein the gate is connected to the common line through a resistor for feeding in of the control voltage of the field effect transistor, wherein a second transistor is connected at the input connection and at the gate of the switching and/or regulating transistor, wherein the collector of the second transistor is connected to the gate of the switching and/or regulating transistor for influencing the control voltage of the switching and/or regulating transistor and wherein the voltage behind the switching and/or regulating transistor is fed back after the drain of the switching and/or regulating transistor between the output of the further protective circuit through a feedback resistor onto the base of the second transistor, wherein a voltage sensor circuit is disposed between the base of the second transistor and the common line for voltage detection or a longitudinal resistor as a current sensor is disposed between the input connection and the source of the switching and/or regulating transistor for current detection.

The safety device according to the present Invention advantageously serves for turning off over voltages or, respectively, for limiting over voltages as well as for turning off over currents or, respectively, for limiting over currents. The protective circuit advantageously gets by without an exchangeable fuse. Thus it is assured that the inaccessible fuse of the voltage and current limiting device, which can include the Zener barrier, does not be destroyed upon occurrence of an over voltage. Advantageously both the necessary requirements of a safety device as well as the requirements of a service free electronic fuse can be combined.

The safety device exhibits in particular a small dissipation loss power, since the safety device has nearly no shunt current in the region of the operating voltage and only a very small voltage drop through the switching and/or regulating transistor, that is a longitudinal voltage drop. The safety device similarly exhibits a small dissipation loss power in its switched off state and possibly in its down controlled state. The safety device can be produced at favorable prices with discrete device elements. Further advantageous embodiments result from the sub claims.

Advantageously, three base circuits of the further protective circuit of the safety device closely connected to each other are presented. Either a longitudinal resistor is placed as a current sensor between the input connection and the source of the switching and/or regulating transistor for current detection. The initiation of the switching or regulating is triggered through the resistors R1 through R3 and is performed by the load current at the line point 9, which flows into the voltage and current limiting device. This circuit is to be applied advantageously there, where high load currents are to be avoided.

Alternatively a voltage sensor circuit dispensing the current sensing longitudinal resistor is disposed between the base of the second transistor and the common line for voltage detection. This circuit without current sensing longitudinal resistor mainly serves for switching off the over voltage or, respectively, for limiting the over voltage. The initiation of the switching off or regulating is triggered through the resistor R5 and the diode D1 and is performed to occur through the input voltage UE. The main advantage of this circuit comprises that the voltage drop of the protective circuit can be maintained extremely small, which causes small dissipation loss powers (compare FIG. 7).

If the protective circuit is to serve simultaneously both for voltage limitation as well as for current limitation, then both the longitudinal resistor R1 is present as a current sensor as well as the voltage sensor circuit is present as a voltage detector, such that advantageously over voltage switching off or, respectively over voltage limitation and over current switching off or, respectively, over current limitation are combined.

A Zener diode or a Diac diode can serve as a voltage detector in the voltage sensor circuit, wherein a resistor R5 is connected in series to the Zener diode or Diac diode. In case switching off properties of this further protective circuit are desired, then a resistor R2 is placed between the base of the transistor Q2 and the source of the switching and/or regulating transistor Q1 for reducing the then required feedback current. The size of this resistor determines the required feedback current. The value of the resistor R2 can be disposed between zero and infinity.

The feedback resistor can be replaced by a control or regulating circuit for adjusting the feedback current independent of the output or, respectively, supply voltage, wherein the control or regulating circuit can be for example a constant current circuit, in order to be able to adjust the maximum feedback current independent of the output voltage or, respectively, of the supply voltage.

According to a particular advantageous embodiment of the safety device, the feedback current is adjusted by way of the feedback resistor or the control or regulating circuit such that in case of overload there results a regulating down of the load current to a minimum value and only upon application of a voltage larger than the input nominal voltage, there is performed a switching off of the current into the voltage and current limiting device, and an automatic switching on again is given upon the following lowering of the supply voltage to the input nominal voltage. This is associated with the advantage that the safety device after its responding or, respectively, after the switching off of the load is capable of automatically switching on again, as soon as the over voltage or, respectively, the over current has been reduced to the input nominal voltage or, respectively, the nominal current. The advantage is presented therewith that the safety device is capable automatically to switch on again after the responding of the safety device or, respectively after the switching off of the load, as soon as the over voltage or, respectively, the over currents return to the input nominal voltage or, respectively, the nominal current.

The resistor can be placed between the base of the transistor Q2 and the source of the switching and/or regulating transistor Q1 for reducing the feedback current in the further protective circuit.

The feedback voltage of the feedback resistor can be both tappable immediately after the drain of the switching and/or regulating transistor as well as at any arbitrary circuit point of the current path between the line points 9 and 16 (FIG. 1) and can be fed at to the base of the second transistor.

The safety device can for example exhibit a feedback resistor of such size that a return current regulated to a fraction of the load current to be limited upon operation with nominal voltage. The safety device then does not switch off upon input nominal voltage and occuring over current; in case of a presence of an over voltage the feedback current is increased by the ratio of the input voltage to.

Protection of the gate source leg is disposed. Alternatively a Zener diode is connected in series to the resistor R4 for reducing the gate control voltage. Depending on this elected field effect transistor, these Zener diodes protect against too large control voltages at the gate. The Zener diodes can also be an integral component of the switching and/or regulating transistor.

The safety device or, respectively protective circuit can exhibit a reset device such as a key, for switching on again the further protective circuit in case the voltage and current limiting device should trigger. This can be of advantage in particular then where the feedback is adjusted such that the protective circuit separates permanently the downstream connected circuit to be protected or, respectively, load from the supply voltage upon responding.

Furthermore a bipolar transistor can be employed as a switching and/or regulating transistor instead of the field effect transistor in the safety device or, respectively, protective circuit, wherein the collector emitter leg is disposed between the input connection and the output connection of the further protective circuit—relative to FIG. 1 at the junction point 9—and wherein the base is connected to the common line through a resistor for feeding of the base control voltage.

Any arbitrary such device can be disposed within the safety device as a voltage and current limiting device, for example a Zener barrier in a known or alternate embodiment, as well as the protective device can be arbitrary, for example a fuse. If the safety device is to be employed in a region endangered by explosion, then a fuse together with usually a Zener barrier is combined in the voltage and current limiting device of the safety device.

Figure 2:
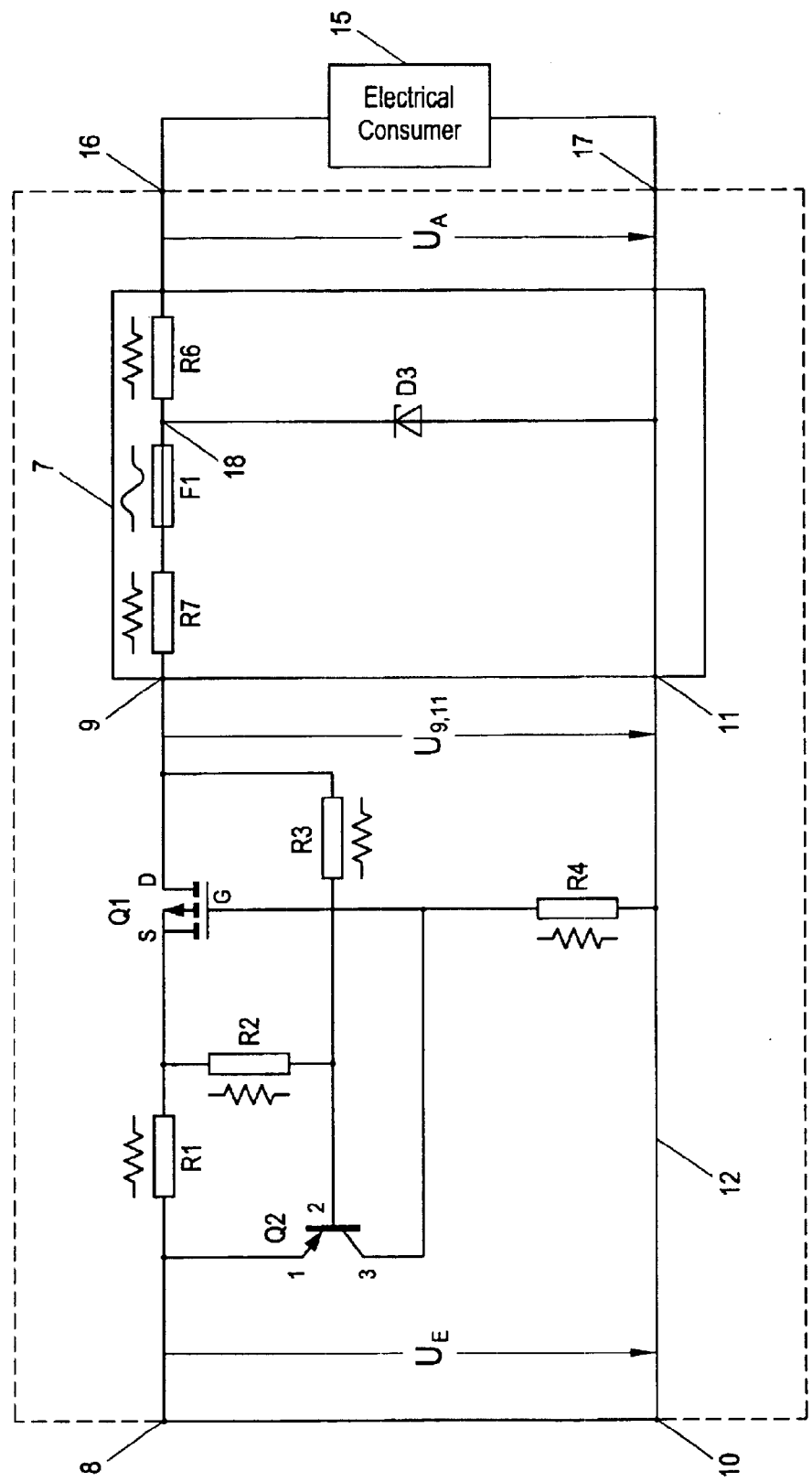
Figure 3:
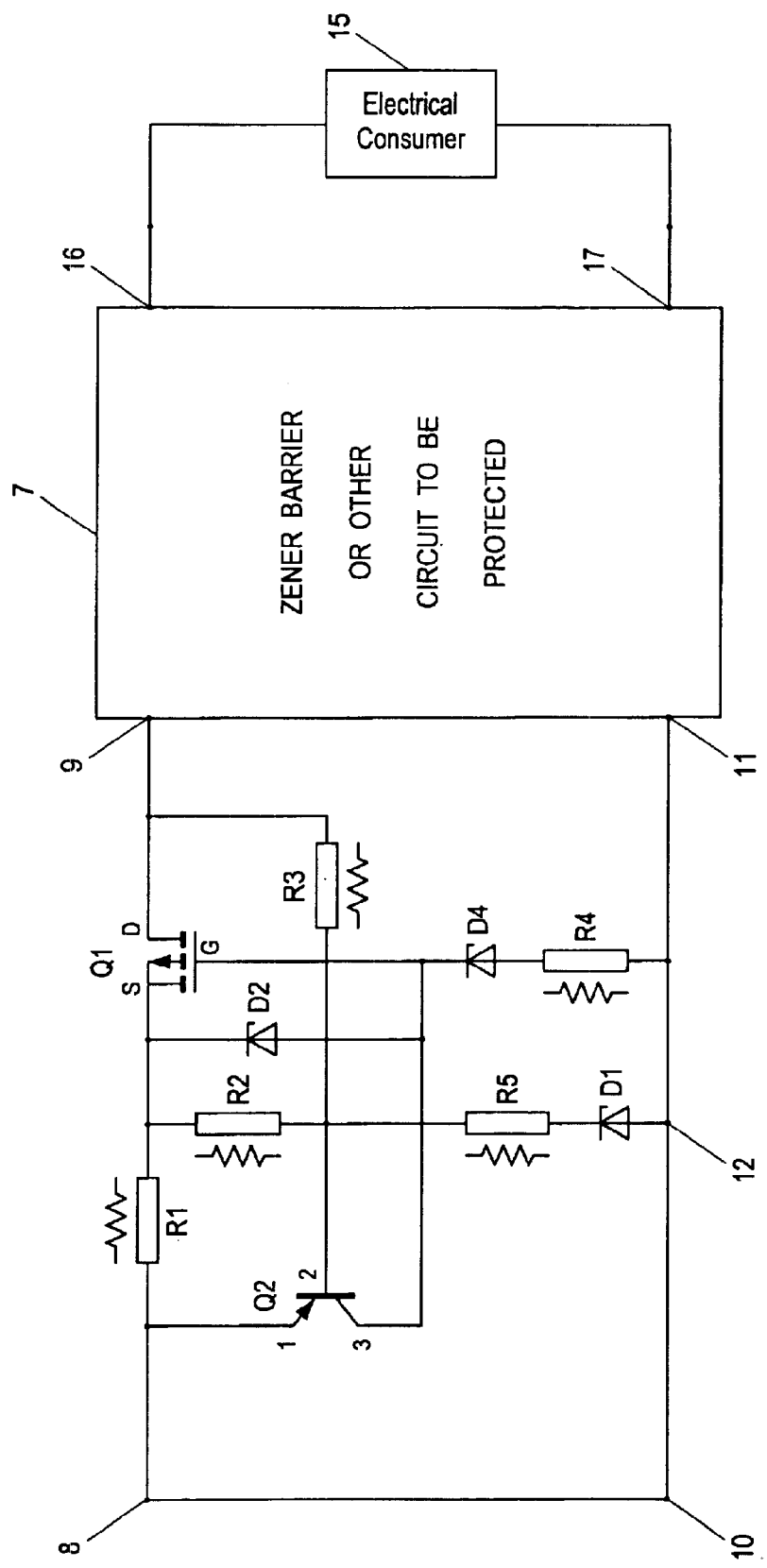
Figure 4:
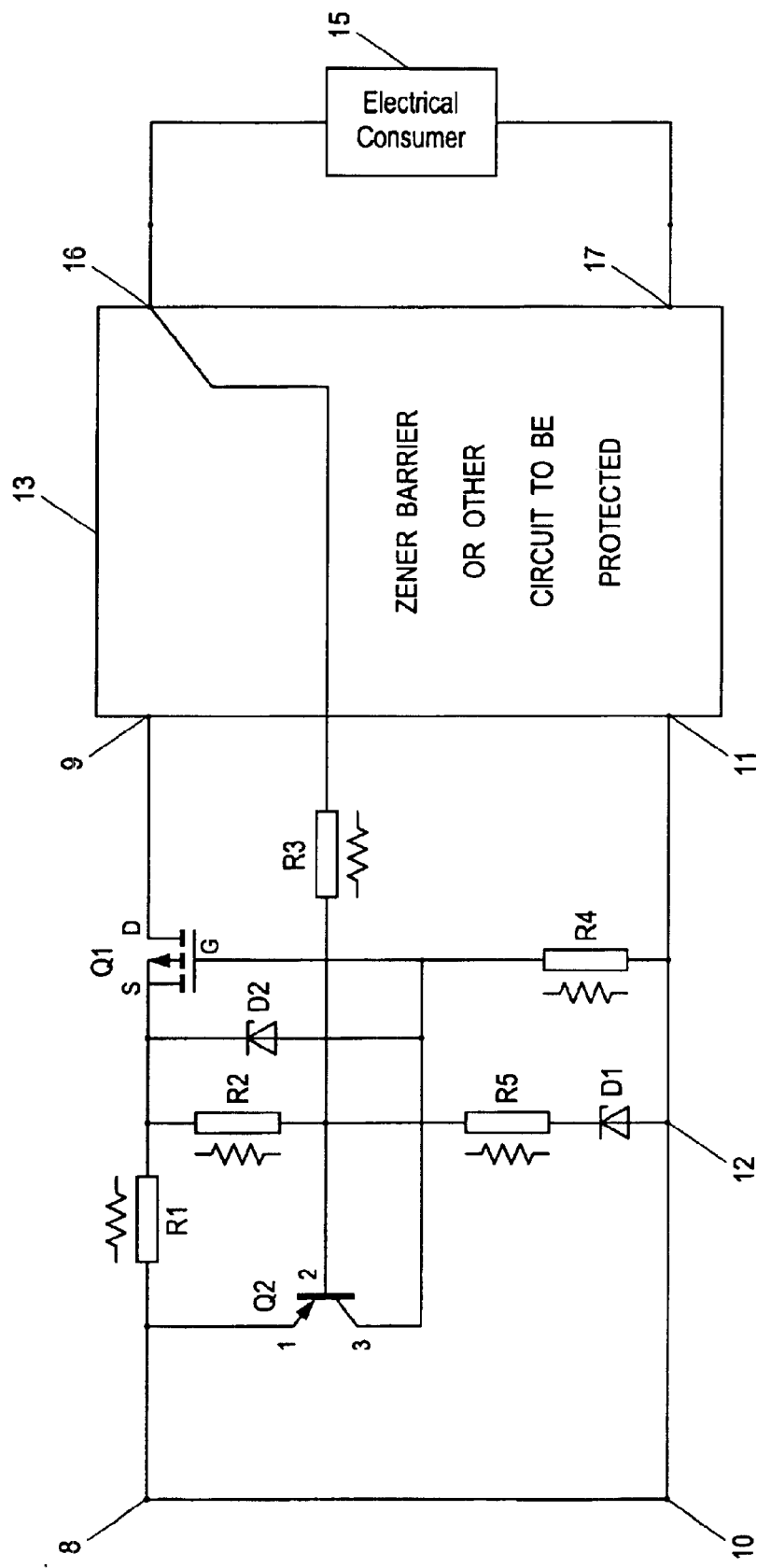
Figure 5:
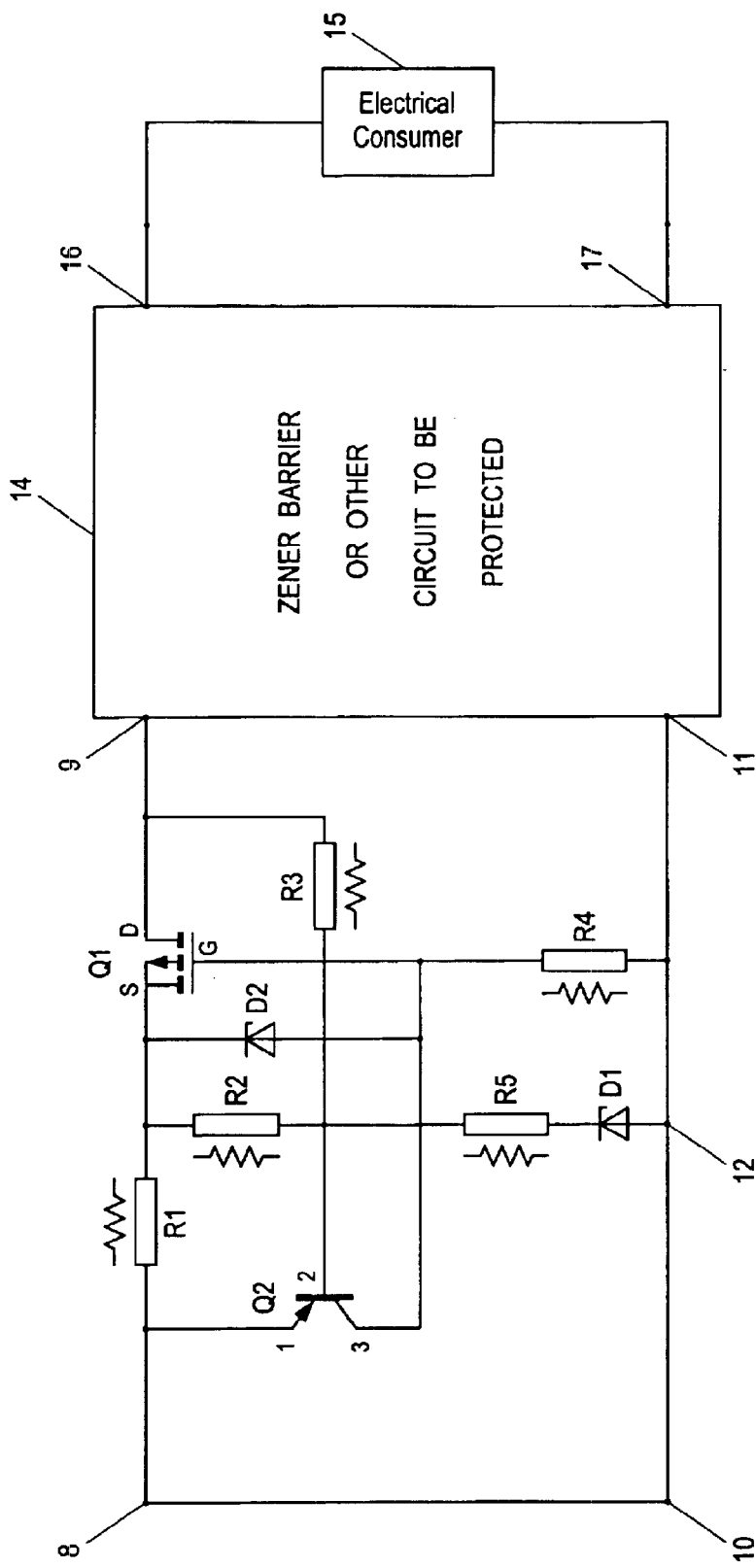
Figure 6:
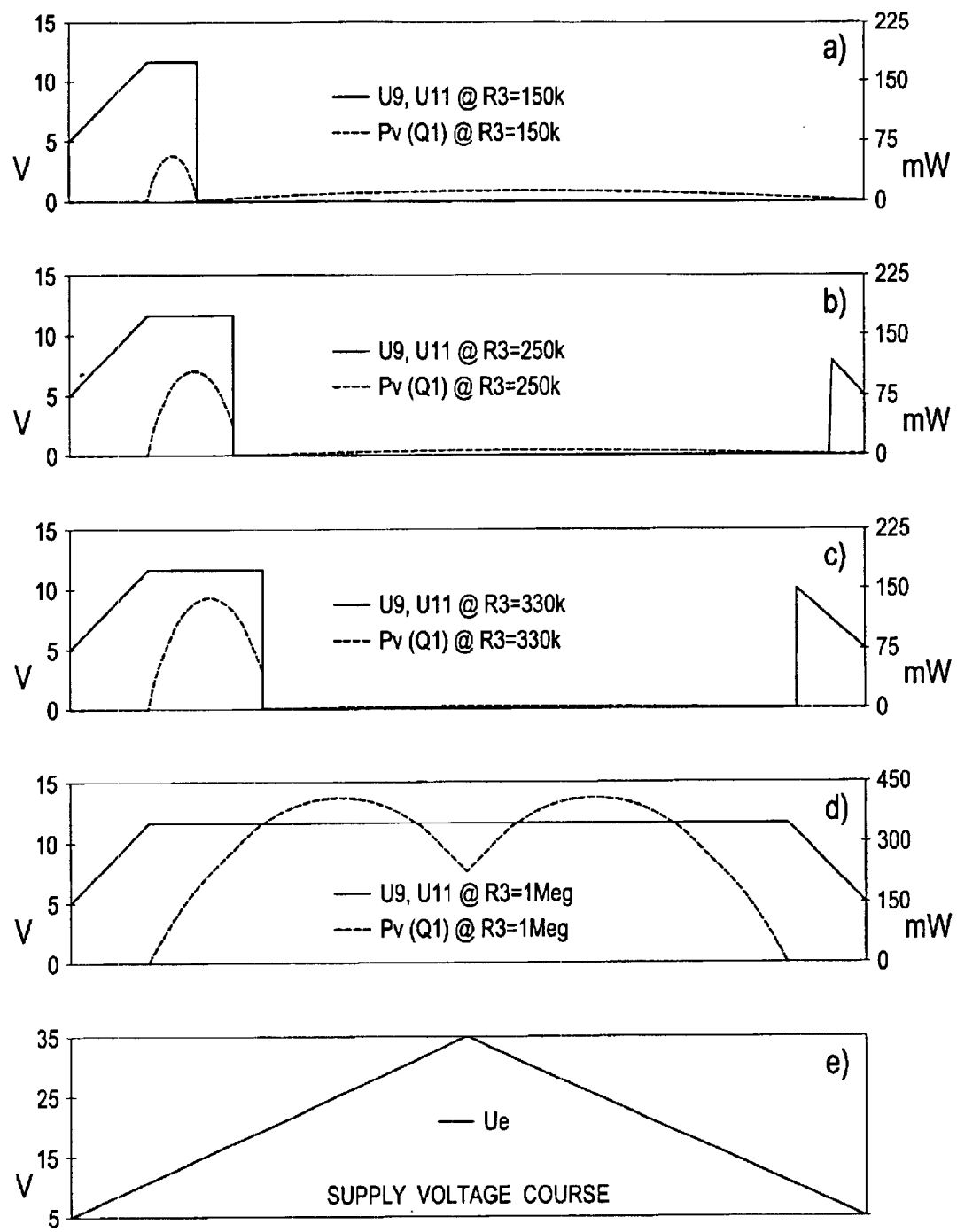
Figure 7:
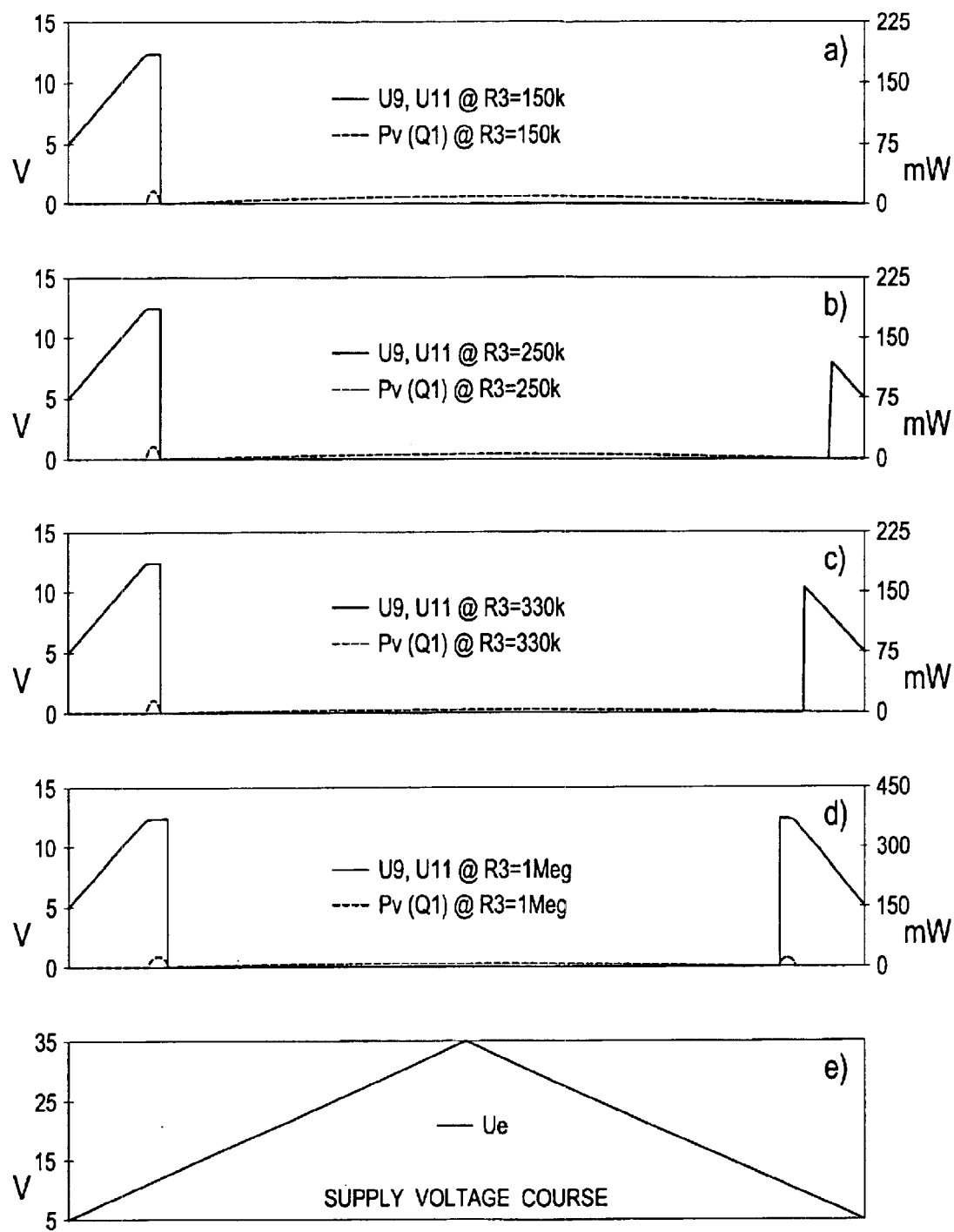

Short description of the drawings, where there is shown:

FIG. 1 a circuit diagram of a safety device for over voltage switching off or, respectively over voltage limitation for protecting the voltage and current limiting device as well as a consumer connected downstream, FIG. 2 a circuit diagram of a further safety device with a current sensing resistor preferably for over current switching off or, respectively over current limitation or other circuit to be protected or of the consumer connected downstream, FIG. 3 a circuit diagram of a safety device with the combination of over current switching off or, respectively, over current limitation and over voltage switching off or, respectively, over voltage limitation, wherein additionally a Zener diode is disposed in the feed line of the gate of the field effect transistor, FIG. 4 the circuit diagram of safety device according to FIG. 3 with a consumer connected downstream, wherein the feedback resistor is connected after the safety device, FIG. 5 a further technical embodiment of the safety device, FIG. 6 voltage courses U9, 11 and UE upon triggering of the safety barrier according to FIG. 2 at different values of the feedback resistor, and FIG. 7 voltage courses U9, 11 and UE upon triggering of the safety barrier according to FIG. 1 at different values of the feedback resistor.

Figure 8:
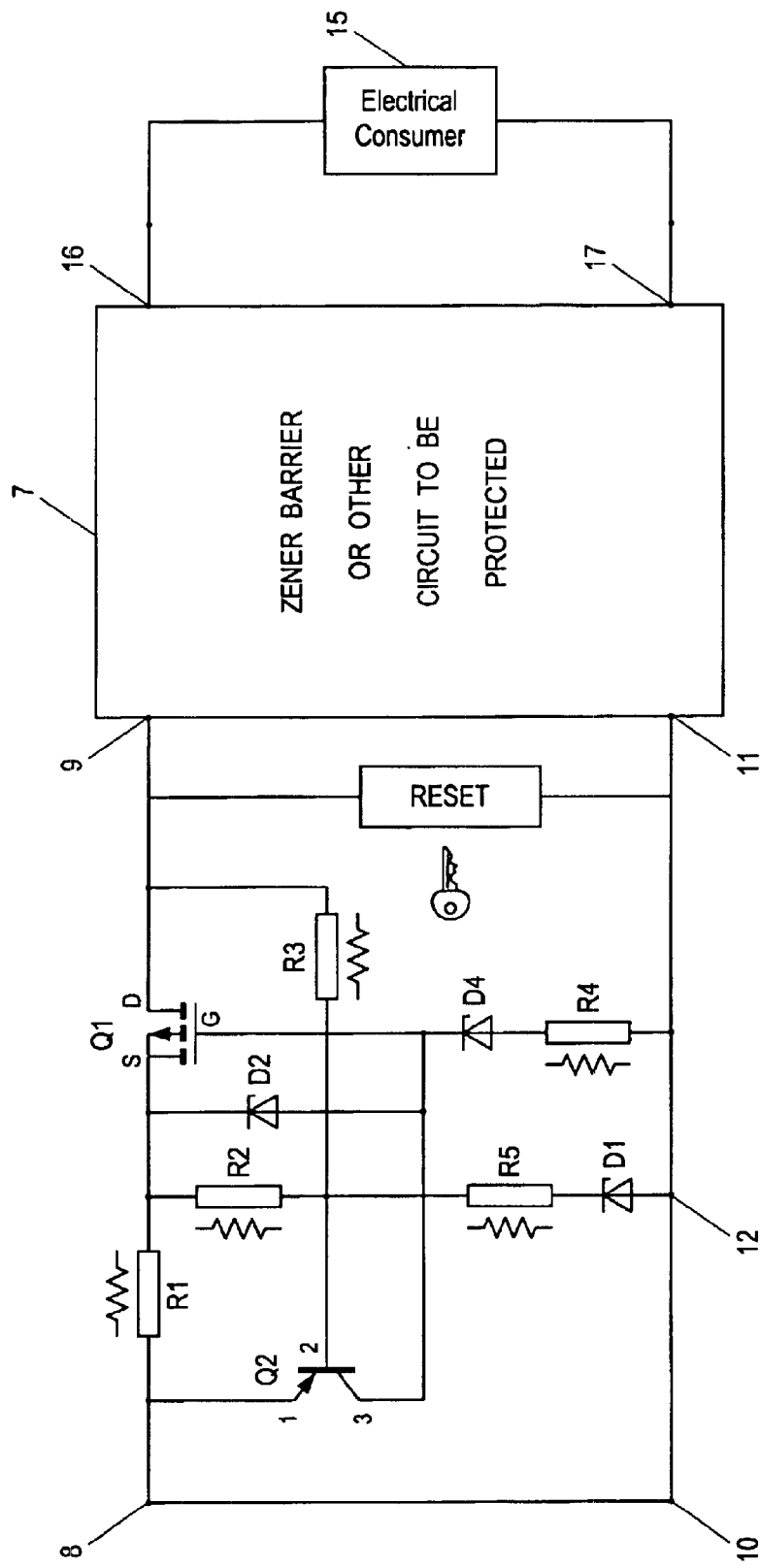

FIG. 8 is a view of a circuit diagram similar to FIG. 3 and additionally featuring a reset.

PATHS FOR PERFORMING THE INVENTION

FIG. 1 shows a circuit diagram of a safety device 19, wherein the circuit diagram serves for voltage detection and preferably represents an over voltage switching off or, respectively, and over voltage limitation for protecting the safety device 19 itself as well as the electrical consumer 15 to be protected and connected downstream. The safety device 19, which can in principle be inserted into a two wire line, has at least two input connections 8, 10 and at least two output connections 16 and 17, wherein the input connection 10 and the output connection 17 belong to a common line 12, for example a ground line, or, respectively can coincide. An electrical consumer 15 is connectable to the output connections 16, 17.

The safety device 19 surrounded by dashed lines comprises in principle a safety fuse F1 disposed between junction point 9 and junction point 16, wherein the safety fuse F1 is preferably a fusible fuse, as well as a voltage limiting device referring to a junction point 18 disposed between junction point 9 and junction point 16 to the common line 12, which voltage limiting device is symbolized by the Zener diode D3; it is also possible to employ a plurality of diodes disposed in parallel or other known barriers such as Zener barriers. A current limiting device follows to the connection junction point 18 between the junction point 9 and junction point 16 of the first voltage limiting device, wherein the voltage limiting device is disposed in series with the safety fuse F1 and is symbolized by the resistor R6. Preferably a resistor R7 can be connected in series to the fuse F1 in front of the connection junction point between the junction point 9 and junction point 16 of the first voltage limiting device. This voltage current limiting device is fully surrounded with edges in FIG. 1 and designated with the reference character 14.

A second protective circuit 20 is disposed in front of the safety fuse F1, wherein the device components of the second protective circuit 20 are disposed in part parallel to the input connections 8, 10 and partially in series with the safety fuse F1 disposed between junction point 9 and junction point 16 or also disposed between junction point 10 and junction point 17 and which further second protective circuit 20 represents also a voltage or current limiting circuit. The voltage or current limiting circuit in principle comprises a field effect transistor Q1 as a switching and/or regulating transistor, wherein the field effect transistor Q1 is operated as a longitudinal control member in the FIGS. 1, 2 or 3 as a switch and/or regulating transistor. For this purpose the field effect transistor Q1 with its source drain leg is disposed longitudinally between the input connector junction point 8 and the junction point 9 and in front of the safety fuse F1, wherein the source is connected to the input connector 8 and the drain is connected to the knot 9. The gate G of the switching transistor Q1 is connected to the common line 12 through a resistor R4 for feeding of the control voltage.

A second transistor Q2 is disposed in front of the source gate leg of the field effect transistor Q1, wherein the output of the second transistor Q2, here the collector Q23 is connected to the gate G of the field effect transistor Q1 for influencing the control voltage of the field effect transistor Q1. The emitter Q21 of the transistor Q2 is connected to the input connector 8. The voltage or, respectively, the current after the source drain leg of the field effect transistor Q1 is fed back to the base Q22 of the second transistor Q2 through the feedback resistor R3 at the knot 9 for controlling the second transistor Q2.

A Zener diode D1 is connected with its anode to the line 12 between the base Q22 of the transistor Q2 and the common line 12, wherein a resistor R5 is disposed in series with the Zener diode D1, wherein the resistor R5 can be optional. A resistor R2 can be disposed on the side of the source S of the field effect transistor Q1 and the base of Q2, wherein the dimensioning of the resistor R2 can be selected such that the resistor R2 serves for reducing the necessary feedback current through the feedback resistor R3.

The triggering of this voltage limiting protective circuit is performed directly by an over voltage, wherein the current from the beginning cannot rise impermissibly in the following voltage and current limiting device D3, R6 with preferably inaccessible fusible fuse F I. Thus the switching off or controlling down through the Zener diode D1 and the resistor R5 is directly initiated through a supply voltage too high. The initiation of the switching off or of the controlling down is thus performed exclusively through the input voltage UE through the inputs 8, 10. The main advantage comprises that the voltage drop and thereby the dissipation loss power of the protective circuit can be maintained extremely small. For example the following values are advantageous: at RON=0.2 Ohm and Ja=100 mA there results a VRest=20 mV.

A circuit diagram of a safety device serving for current limiting and a current switch off or, respectively, current limitation for protecting the safety device itself as well as a downstream following electrical consumer 15 to be protected are illustrated in FIG. 2. A resistor R1 is likewise connected to the input connector 8, wherein the second end of the resistor R1 is connected to the source S of the field effect transistor Q1. This resistor R1 serves as a current sensor for recognizing of impermissibly high currents. The resistor R2 can be similarly present between R1 on the side of the source S and the base of Q2, wherein the resistor R2 serves here for reducing the necessary feedback current through the feedback resistor R3.

The circuit is constructed in standard operations such that the field effect transistor Q1 receives a control voltage from the supply voltage through the resistor R4 and is maintained in an on-state, such that the drain current flows through the current sensor resistor R1 and the switching transistor Q1. Nearly no control current flows in this state and thus also no shunt current flows into the gate, wherein the shunt current could falsify the measurement value of the current of a possible measurement section. The current sensing resistor R1 controls the base Q22 of the transistor Q2 through the resistor R3, wherein the transistor Q2 is blocked in standard operation.

If the current in the resistor R1 rises to a value above the control voltage UBE of Q2, for example to 0.6 volts,—for example the shunt current rises in the voltage and current limiting device 7 upon an over voltage—then additionally a correspondingly rising UBE-voltage is fed back to the base Q22 of the transistor Q2 through the feedback resistor R3 such that the transistor Q2 becomes conductive. The control voltage of the gate G of the field effect transistor Q1 drops thereby such that the drain current is switched off or, respectively, controlled down and thereby the output current of the protective circuit is switched off or, respectively, controlled down and cannot rise further (constant current). Thus a time based action behavior or flip behavior and regulating behavior occurs depending on the dimensioning of the feedback resistor R3, wherefore the properties of the protective circuit as an automatic controller or as a switch are set by R3.

A small holding current, that is a sensor current or a residual current, flows in the switched off state of the further protective circuit through the feedback resistor R3 and the resistor R2 such present to the outputs 9, 11. This residual current can be easily received by the electronics to be protected since these resistors can be laid out correspondingly large for example by a proper current reception of the electronics or by a Zener diode.

It is to be noted in connection with the establishment of the further protective circuit according to FIG. 2 that the voltage and current limiting device, for example a Zener barrier, represents a voltage depending load, that is an over current is caused immediately by an over voltage at the voltage and current limiting device and only thereby the switching off of the further protective circuit is initiated. A short circuit after the safety device or, respectively, the voltage and current limiting device or, respectively, the Zener barrier is not to be taken into consideration in dimensioning since the fuse F1 is not permitted to trigger the safety device of the previous constructions. The switch off current of the further protective circuit is laid out exclusively for protecting the fuse F1 within the voltage and current limiting device 7, 13, 14.

Additionally constructions of the voltage and current limiting device are possible beyond those recited as have been avoided up to now in the state-of-the-art. The current limiting circuit or, respectively, the resistor R6 has to be dimensioned such that the non-exchangeable fuse F1 is not destroyed upon short circuit at the output. The current limiting circuit or, respectively the resistor R6 of the voltage and current limiting device 7, 13, 14 can be exclusively dimensioned according to EX-conditions since now an additional current protection is furnished for the fuse F1. For example a lower resistor R6 can furnish a larger output power as previously without that simultaneously the fuse F1 and the Zener diode D3 or several such diodes within the voltage and current limiting device 7, 13, 14 have to be reinforced, which means a larger deliverable power in standard operation. In particular such improved EX-conditions are advantageous when a in particular a nonlinear load 15 is connected to the safety device.

FIG. 3 shows a safety device in combination with over currents switching off or, respectively, over current limitation and over voltage switching off or, respectively, over voltage limitation of FIGS. 1 to 4 protecting the voltage current limiting device 7 as well as the load 15 connected downstream. The current sensing resistor R1 and the Zener diode D1 of FIGS. 1 and 2 are present such that the functional features of the FIGS. 1 and 2 are present together. In addition a Zener diode D4, which is optional, is disposed here in series with the resistor R4 in the gate feed line of the field effect transistor Q1.

Furthermore a Zener diode D2 is disposed between the gate and the source of the field effect transistor Q1 and parallel to the gate G and the source S of the field effect transistor for protecting the gate source leg in FIG. 3, wherein the Zener diode D2 can also be an integral component of the field effect transistor Q1

FIG. 4 shows the circuit diagram of the safety device according to FIG. 3 for the protection of the voltage and current limiting device 13 as well as of the consumer 15 connected downstream. The feedback resistor R3 is connected to the output 16 of the voltage and current limiting device 13 only after the voltage and current limiting device 13.

FIG. 5 shows a further technical embodiment of the protective circuit, wherein the diode D2 is present without the diode D4 parallel to the source gate leg of this switching and/or regulating transistor Q1, otherwise however the protective circuit corresponds to that shown in FIG. 3.

The feedback resistor R3 can be replaced by a control or automatic control circuit, wherein the control or automatic control circuit can also be a constant current circuit independent of the output or, respectively, supply voltage for the adjustment of the feedback current.

The feedback current can be adjusted by way of the feedback resistor R3 or of the control or regulating circuit such that a controlling down of the load current to a minimal value results upon overload and only upon application of a voltage larger than the nominal voltage, there is performed a switching off of the load current and thus an automatic switching on again is given during a following lowering of the supply voltage to nominal voltage.

Certain dimension conditions have to be maintained for the feedback resistor R3 in order for the further protective circuit 20 to again automatically switch on after responding or, respectively, triggering. The lower limit for the dimension of the resistor R3 is given by having the voltage drop over the resistor R2 within the voltage divider R2, R3 remains smaller as the UBE of the transistor Q2, where the transistor Q2 otherwise would open. The upper limit for the dimensioning of the feedback resistor R3 is arbitrarily high depending on the specific application, which means that the feedback resistor R3 can approach infinity, wherein a constant current behavior would set in in this case.

Various illustrating pictures a) through e) are shown in FIG. 6, wherein this FIG. 6 refers to the safety device of FIG. 2. In each case the voltage U9-11 as well as the dissipation loss power over the input voltage or, respectively supply voltage course is plotted in the illustrating pictures a) through d); parameter is a changeable value for the feedback resistor R3 upon a certain selected dimensioning of the remaining device components. If the feedback resistor R3 is selected to be below a certain value, then the further circuit cannot any longer automatically switch on after responding which is the case here for example at the value of R3 of 150 KOhm. In case of the value of about 250 KOhm or 330 KOhm the further circuit again automatically switches on after its responding which is shown in the illustrating pictures b) and c). If the resistor R3 is dimensioned beyond a certain limit, then a constant output voltage appears in consequence of the voltage limiting effect of the voltage and current limiting device 7, 13, 14, which is then shown in the illustrating picture d). However here the dissipation loss power of the remaining circuit increases over proportionally.

FIG. 7 shows various illustrating pictures a) through e) similar to FIG. 6, wherein the illustrating pictures a) through e) refer to the safety device of FIG. 1. The voltage courses U9-11 as well as the dissipation loss powers are shown over the input voltage or, respectively, supply voltage course upon triggering of the safety device at different values of the feedback resistor. The safety device does not switch on any longer after its triggering in case the voltage has dropped to the input nominal voltage UENEN in case of small values of the feedback resistor for example 150 kOhm at otherwise determined selected dimensioning of the remaining device components. The safety device automatically and highly advantageously switches on again at higher values, for example starting at R3=250 Ohm in contrast, where the triggering and endangering voltage has dropped to the input nominal voltage UENEN. This is also a situation in case of very large values of R3. It is further recognizable from the illustrating pictures that in fact the dissipation loss power of the safety device is extremely small in all cases to be considered.

In the following there is provided an example for a 'coarse' dimensioning (fine dimensioning is performed with a simulator program) of the resistor's R1, R2 and R3 for adapting the current limiter flip-flop, wherein here the variant switching off is considered (not flipping):

$U_{BEQ2}=(U_E)*(R_1+R_2))/(R_1+R_2+R_3)=R_3=((U_E U_{BEQ2})-1*(R_1+R_2)$

Defined $I_{max}$ in $Q_1$=50 mA $R_1$=0.5V/50 mA=10 Ohm

*$U_{BEQ2}$ be 0.5 V

For a desire to re-switching on the short circuit current is fixed to about 10 percent of $I_{max}$ for the nominal input voltage $U_{ENEN}$:

$U_{R1}$=10 Ohm*5 mA=32 mV $U_{R2}$=0.5 V−0.05 V=0.45 V

Definition of the shunt current by $R_3$ about $R_{2=30}$ microAmp.

$R_2$=0.45 V/30 microAmp=15 KOhm $R_2$=(($U_E/U_{BEQ2}$)−1)*($R_1+R_2$)=(8V**/0.5V−1)*(10 Ohm+15

**assumed f. Ex

Commercial Applicability:

The subject matter of the present invention is commercially applicable in particular for explosion protected rooms as a safety device as well as the further protective circuit also always there, where an electrical device is to be protected against over voltage or an over current. The further protective circuit alone can advantageously be employed as an electrical or, respectively, electronic shunt fuse, where the further protective device protects downstream electrical apparatus against impermissible voltages and currents upon occurrence of over voltages or over currents; the connected apparatuses are thus also not damaged in case of an inadvertent connection to supply voltages which are too large.

Mr. Preference Numerals:

Q1 field effect transistor

Q2 transistor

Q21 emitter of transistor Q2

Q22 base of transistor Q2

Q23 collector of transistor Q2

R1, R2, R3, R4, R5, R6, R7, resistors
D1, D2, D3, D4 diodes
F1 fusible fuse
7, 13, 14 voltage and current limiting device, four example Zener barrier
8, 10 input connections of the safety device
9, 11, outputs or, respectively, knots of the further protective device
12 common line, as ground line
15 consumer or, respectively, load
16, 17 output connectors of the safety device
18 knots
19 safety device
20 further protective circuit
D drain if Q1
S source of Q1
G gate of Q1
$U_E$ input voltage
$U_A$ output voltage
$U_{ENEN}$ input nominal voltage

What is claimed is:

1. Safety device for limiting of current and voltage of an electrical consumer connected downstream to the safety device with at least one input connector and one output connector as well as input connector and output connector of a common line wherein the safety device includes at least one voltage and current limiting device and comprising at least one protective device, a voltage limiter device referenced to the common line, a current limiter device connected to the output of the voltage limiter device as well as a protective circuit, which protective circuit is disposed upstream at the voltage and current limiting device, wherein the protective circuit includes a field effect transistor as a switching and regulating transistor, wherein the source drain leg of the field effect transistor is disposed between the input connector and the voltage and current limiting device and
wherein a gate of the switching and regulating transistor is connected to the common line through a control voltage feeding resistor for feeding in a control voltage of the field effect transistor, wherein a second transistor is connected to the input connector and to the gate of the switching and regulating transistor, wherein the collector of the second transistor is connected to the gate of the switching and regulating transistor for influencing the control voltage of the switching and regulating transistor, and wherein a feedback voltage is fed back to the base of the second transistor over a feedback resistor from an output of the protective circuit, wherein a voltage sensor circuit is disposed between the base of the second transistor and the common line for voltage detection.

2. Safety device according to claim 1 characterized in that a series resistor operates as a current sensor and the voltage sensor circuit are present simultaneously both for voltage detection as well as for current limitation.

3. Safety device according to claim 1 or 2 characterized in that the voltage sensor circuit comprises a sensor diode and a sensor resistor connected in series.

4. Safety device according to claim 1 characterized in that the feedback current is adjusted by way of the feedback resistor such that in case of overload there results a regulating down of the load current to a minimum value and a switching off of the current in the voltage and current limiting device is performed only upon application of a supply voltage larger than an input nominal voltage and wherein an automatic switching on again is given upon following lowering of the supply voltage to the input nominal voltage.

5. Safety device according to claim 1 characterized in that a feedback current reducing resistor is disposed between the base of the second transistor and a source of the switching and regulating transistor for reducing the feedback current.

6. Safety device according to claim 1 or 2, characterized in that the feedback voltage of the feedback resistor is tappable both immediately after a drain of the switching and regulating transistor as well as at any arbitrary circuit point of a current path between line points and that the feedback voltage of the feedback resistor is fed back to the base of the second transistor.

7. Safety device according to claim 1 or 2 characterized in that a protection Zener diode is disposed between the gate and the source of the switching and regulating transistor parallel to the gate and to a source of the switching and regulating transistor for protecting the gate source leg.

8. Safety device according to claim 7 characterized in that the protection Zener diode and a gate control Zener diode are integral components of the switching and regulating transistor.

9. Safety device according to claim 1 characterized in that a gate control Zener diode is connected in series with the control voltage feeding resistor for reducing the gate control voltage of the switching and regulating transistor.

10. Safety device according to claim 1 characterized in that the feedback resistor is replaced by a control circuit for adjusting the feedback current independent of the output voltage and of the supply voltage.

11. Safety device according to claim 10 characterized in that the control circuit is a constant current circuit.

12. Safety device according to claim 1 or 2 characterized in that the safety device includes a reset device for switching on again in the protective circuit after triggering of a switching off of a current in the voltage and current limiting device.

13. Safety device according to claim 1 characterized in that the second transistor is a field effect transistor.

14. Safety device according to claim 1 characterized in that a bipolar transistor is employed as the switching and regulating transistor.

15. A method for limiting of current and voltage of an electrical consumer involving a safety device comprising the steps:
furnishing the safety device with at least a voltage and current limiting device and with at least one protective device as a fusible fuse, with a voltage limiter device referenced to a common line, with a current limiter device connected to the output of the voltage limiter device as well as with a protective circuit, which protective circuit is disposed upstream the voltage and current limiting device, wherein the protective circuit exhibits a field effect transistor as a switching and regulating transistor, wherein the source drain leg of the switching and regulating transistor is disposed between an input connector and the voltage and current limiting device;
connecting a gate of the switching and regulating transistor to a common line through a control voltage feeding resistor;
connecting a second transistor to the input connector and to the gate of the switching and regulating transistor, wherein a collector of the second transistor is connected to a gate of the switching and regulating transistor for influencing a control voltage of the switching and regulating transistor, and
disposing a voltage sensor circuit between a base of the second transistor and the common line for voltage detection;

connecting an electrical consumer downstream to the safety device with at least one input connector and one output connector as well as input connector and output connector of the common line;

feeding in the control voltage of the switching and regulating transistor from the gate to the common line through the control voltage feeding resistor;

feeding a feedback voltage back to the base of the second transistor over a feedback resistor from an output of the protective circuit.

16. A safety barrier for limiting the current and voltage of an electric consumer connected downstream of the safety barrier, said safety barrier having at least one input connection and one output connection as well as input and output connections of a shared line whereby the safety barrier has at least one voltage and current limiter comprising at least one fuse, a voltage limiter linked to the shared line, a current limiter connected to the output of said voltage limiter as well as a protective circuit, which is arranged upstream of the voltage and current limiter, characterized in that the protective circuit has a field effect transistor as a switching and regulating transistor whose source-drain link is arranged between the input connection and the voltage and current limiter, and a gate of the switching and regulating transistor, for feeding a control voltage of the switching and regulating transistor, is connected through a control voltage feeding resistor to the shared line, wherein a second transistor is connected to the input connection and to the gate of the switching and regulating transistor, wherein a collector of the second transistor, in order to influence the control voltage of the switching and regulating transistor, is connected to the gate of the switching and regulating transistor, and the feedback voltage downstream of the switching or regulating transistor and downstream of a drain of the switching and regulating transistor is fed back between outputs of the protective circuit through a feedback resistor to a base of the second transistor, wherein for purposes of voltage detection, there is a voltage sensing circuit arranged between the base of the second transistor and the shared line.

17. The safety barrier according to claim 16, characterized in that, a series resistor is present in the form of a current sensor and the voltage sensing circuit is present in the form of a voltage detector concurrently for voltage detection as well as for current limitation pertaining to the protective circuit.

18. The safety barrier according to claim 16, characterized in that the voltage sensing circuit comprises a sensor Zener diode or trigger diode and a sensor resistor, which are connected in series.

19. The safety barrier according to claim 16, characterized in that a feedback current is set by means of the feedback resistor or by means of the switching and regulating transistor in such a way that, in case of overload, a load current is cut back to a minimum value and only after an application of a supply voltage, that is greater than a rated input voltage, is the load current switched off in the voltage and current limiter and autonomously switched back on at the time of the subsequent lowering of the supply voltage to the rated input voltage.

20. The safety barrier according to claim 16, characterized in that, in order to reduce a feedback current in the protective circuit, a feedback current reducing resistor is installed between the base of the second transistor and the source of the switching and regulating transistor.

21. The safety barrier according to claim 16, characterized in that a reference voltage or a feedback voltage of the feedback resistor can be tapped directly downstream of the drain of the switching and regulating transistor as well as at any desired circuit point of the current path through the voltage and current limiter, and is fed back to the base of the second transistor.

22. The safety barrier according to claim 16, characterized in that, parallel to the gate and the source of the switching and regulating transistor, a protection Zener diode is applied between said gate and the source in order to protect the gate-source link.

23. The safety barrier according to claim 22, characterized in that the protection Zener diode and a gate control Zener diode are integral components of the switching and regulating transistor.

24. The safety barrier according to claim 16, characterized in that, in order to reduce a gate drive voltage of the switching and regulating transistor, a gate control Zener diode is connected to the control voltage feeding resistor.

25. The safety barrier according to claim 16, characterized in that said safety barrier has a reset means for switching the protective circuit back on after a load current has been switched off in the voltage and current limiter.

26. The safety barrier according to claim 16, characterized in that the second transistor is a field effect transistor.

27. A safety barrier for limiting the current and voltage of an electric consumer connected downstream of the safety barrier, said safety barrier having at least one input connection and one output connection as well as input and output connections of a shared line whereby the safety barrier has at least one voltage and current limiter comprising at least one fuse, a voltage limiter linked to the shared line, a current limiter connected to the output of said voltage limiter as well as a protective circuit, which is arranged upstream of the voltage and current limiter, characterized in that, the protective circuit has a field effect transistor as a switching and regulating transistor whose source-drain link is arranged between the input connection and the voltage and current limiter, and a gate of the switching and regulating transistor, for feeding a control voltage of the switching and regulating transistor, is connected through a control voltage feeding resistor to the shared line, wherein a second transistor is connected to the input connection and to the gate of the switching and regulating transistor, wherein a collector of the second transistor, in order to influence the control voltage of the switching and regulating transistor, is connected to the gate of the switching and regulating transistor, and the feedback voltage downstream of the switching and regulating transistor and downstream of a drain of the switching and regulating transistor is fed back between outputs of the protective circuit through a switching and regulating circuit, in order to set a feedback current, irrespective of an output or supply voltage, to a base of the second transistor, wherein for purposes of voltage detection, there is a voltage sensing circuit arranged between the base of the second transistor and the shared line.

28. The safety barrier according to claim 27, characterized in that the switching and regulating circuit is a constant current circuit.

29. A safety barrier for limiting the current and voltage of an electric consumer connected downstream of the safety barrier, said safety barrier having at least one input connection and one output connection as well as input and output connections of a shared line whereby the safety barrier has at least one voltage and current limiter comprising at least one fuse, a voltage limiter linked to the shared line, a current limiter connected to the output of said voltage limiter as well as a protective circuit, which is arranged upstream of the voltage and current limiter, characterized in that the protective circuit has a bipolar transistor or electronic relay as a switching and regulating transistor whose source-drain link is arranged between the input connection and the voltage and current limiter, and a gate of the switching and regulating transistor, for feeding a control voltage of the switching and regulating transistor, is connected through a control voltage feeding resistor to the shared line, wherein a second transistor is connected to the input connection and to the gate of the switching and regulating transistor, wherein a collector of the second transistor, in order to influence the control voltage of the switching and regulating transistor, is connected to the gate of the switching and regulating transistor, and the feedback voltage downstream of the switching and regulating transistor and downstream of a drain of the switching and regulating transistor is fed back between outputs of the protective circuit through a feedback resistor to a base of the second transistor, wherein for purposes of current detection, there is a series resistor arranged between the input connection and a source of the switching and regulating transistor as a current sensor.

30. Electrical protective circuit for limiting of current and voltage for protecting an electrical consumer, with at least one input connection and an output connection as well as input connection and output connection of a common line;

wherein a voltage and current limiting device is disposed within an electrical protective circuit, wherein the voltage and current limiting device includes a field effect transistor as a switching and regulating transistor characterized in that a source-drain-leg of the switching and regulating transistor is disposed between the input connection and the output connection and a gate of the switching and regulating transistor is connected to the common line through a resistor for feeding in a control voltage of the switching and regulating transistor and wherein a second transistor is connected to the input connection and to the gate of the switching and regulating transistor, wherein a collector of the second transistor is connected to the gate of the switching and regulating transistor for influencing a control voltage of the switching and regulating transistor and wherein the output voltage downstream of the source-drain-leg of the switching and regulating transistor is fed back at the output connection to a base of the second transistor through a feedback resistor, wherein a sensor Zener diode is disposed between the base of the second transistor and the common line.

31. Electrical protective circuit for limiting of current and voltage for protecting an electrical consumer, with at least one input connector and an output connector as well as input connector and output of a common line, wherein a voltage and current limiting device is disposed within the protective circuit, wherein the voltage and current limiting device includes a field effect transistor as a switching and regulating transistor characterized in that a source-drain-leg of the switching and regulating transistor is disposed between the input connector and the output connector and a gate of the switching and regulating transistor is connected to the common line through a control voltage feeding resistor for feeding in a control voltage of the switching and regulating transistor and wherein a second transistor is connected to the input connector and to the gate of the switching and regulating transistor, wherein a collector of the second transistor is connected to the gate of the switching and regulating transistor for influencing the control voltage of the switching and regulating transistor and wherein an output voltage after the source-drain-leg of the switching and regulating transistor is fed back at the output connector to a base of the second transistor through a feedback resistor, wherein a sensor Zener diode is disposed between the base of the second transistor and the common line.

* * * * *